Jan. 26, 1932.                G. H. NYSTROM                1,842,878
                          AUTOMOBILE HEADLIGHT LENS
                       Filed March 13, 1930     4 Sheets-Sheet 1

Fig. 1.

Inventor
G. H. Nystrom

By Lacey & Lacey, Attorneys

Jan. 26, 1932.  G. H. NYSTROM  1,842,878
AUTOMOBILE HEADLIGHT LENS
Filed March 13, 1930  4 Sheets-Sheet 2
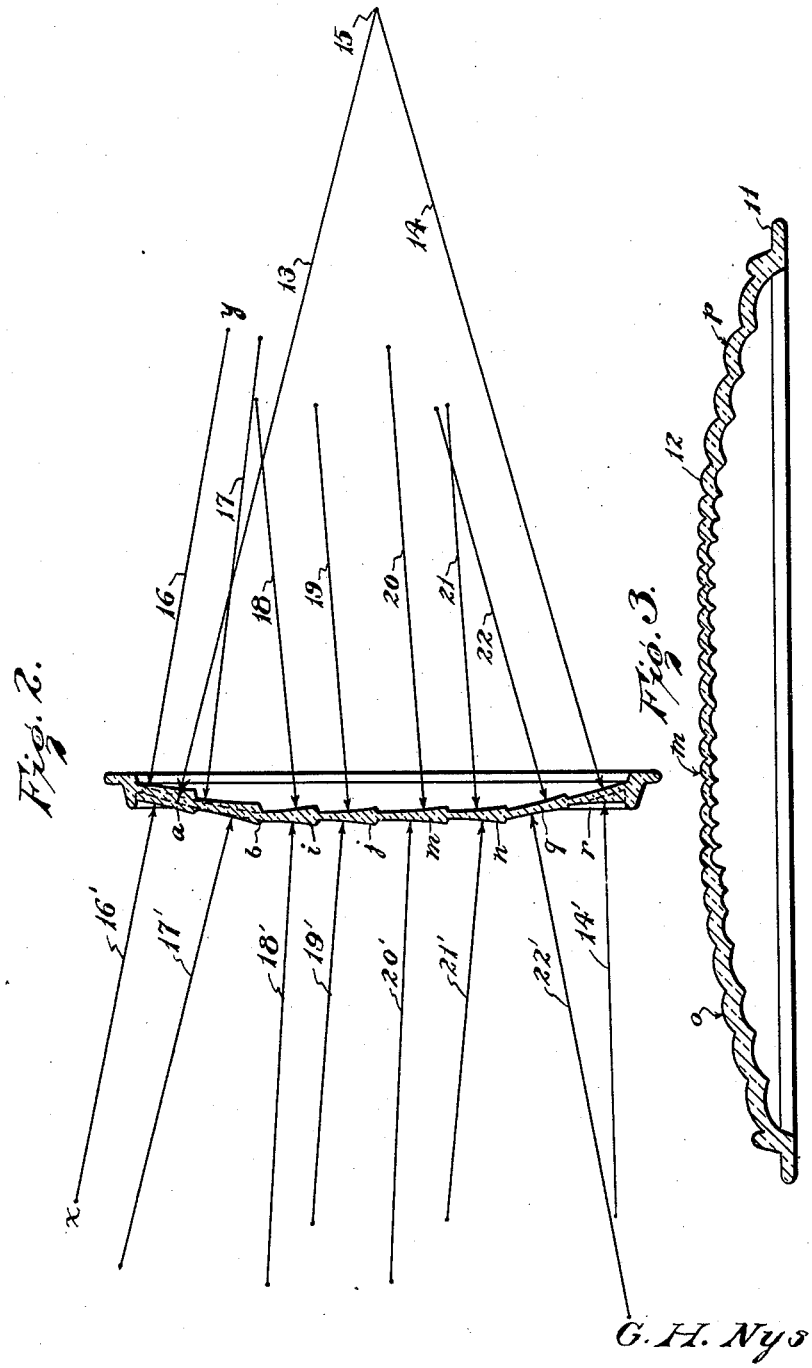

Jan. 26, 1932. G. H. NYSTROM 1,842,878
AUTOMOBILE HEADLIGHT LENS
Filed March 13, 1930 4 Sheets-Sheet 3
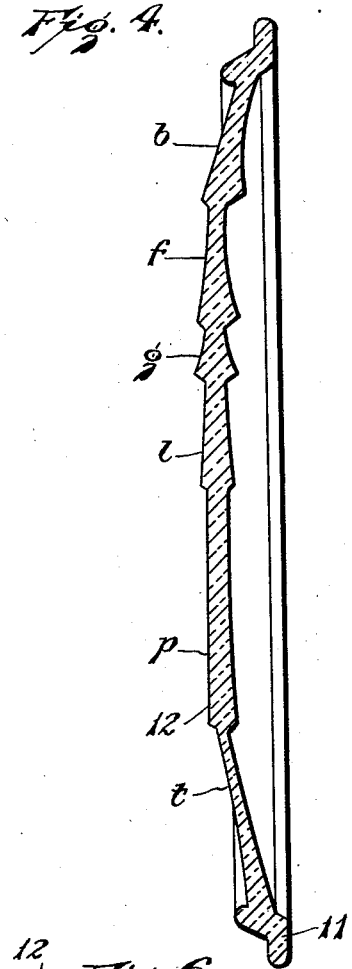
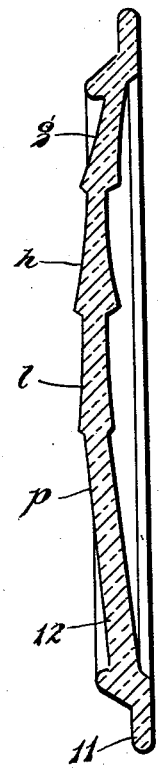
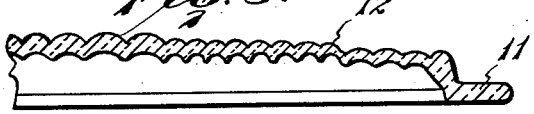
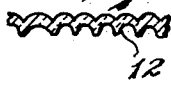
Inventor
G. H. Nystrom
By Lacey & Lacey,
Attorneys Jan. 26, 1932.   G. H. NYSTROM   1,842,878
AUTOMOBILE HEADLIGHT LENS
Filed March 13, 1930    4 Sheets-Sheet 4
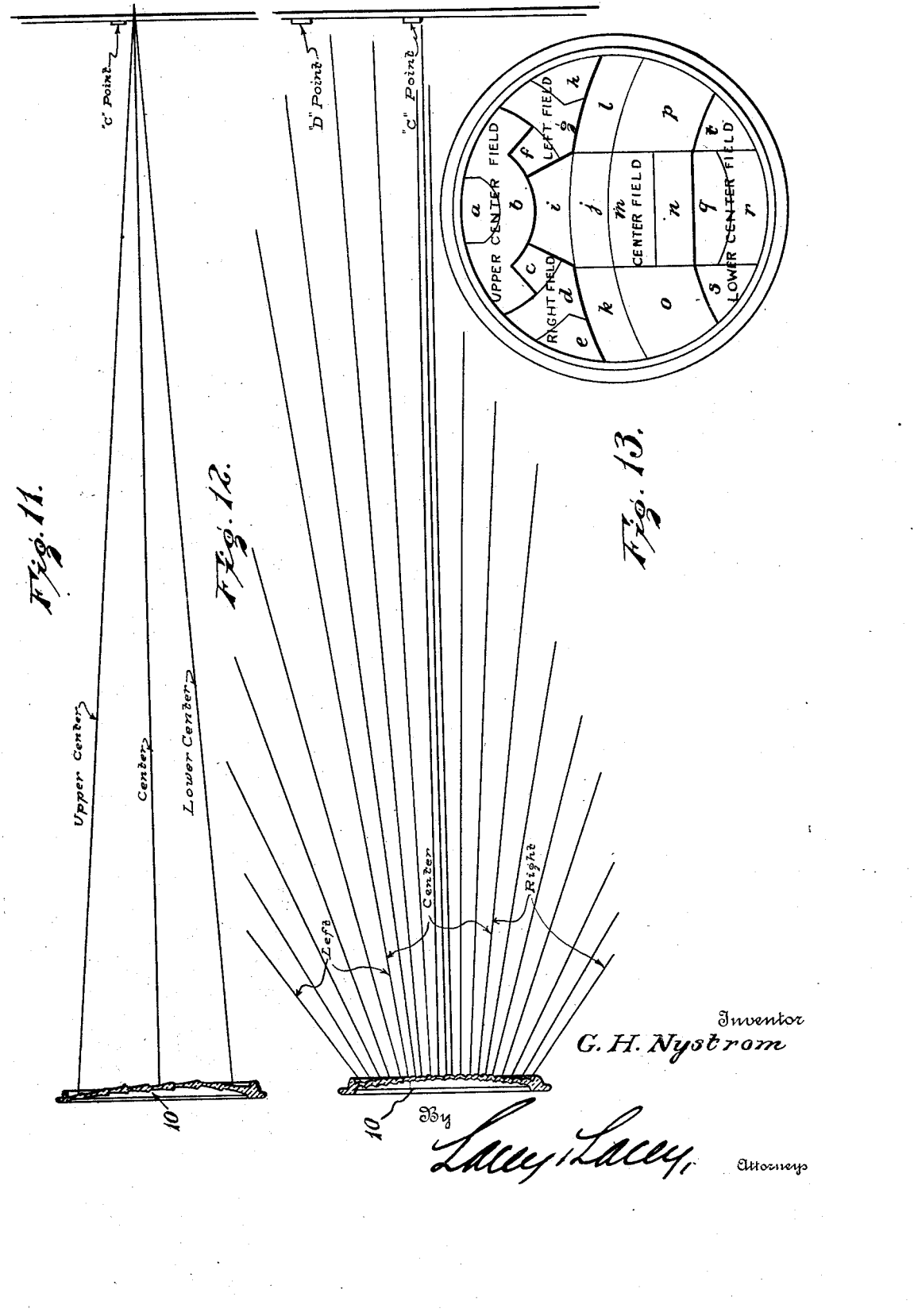

Patented Jan. 26, 1932

1,842,878

UNITED STATES PATENT OFFICE

GUSTAF HERMAN NYSTROM, OF COLUMBUS, OHIO

AUTOMOBILE HEADLIGHT LENS

Application filed March 13, 1930. Serial No. 435,562.

This invention pertains to lenses of the spread light type patented by me September 28, 1926, No. 1,601,688.

This invention relates to lenses more particularly applicable to automobile headlights and has for an object to provide a lens having groups of prisms constituting prismatic fields, each individual field functioning to project light in a predetermined direction so that long distance as well as lateral spread will be accomplished to produce better illumination without throwing a blinding glare against an approaching driver.

A further object of the invention is to provide a lens having novel prismatic fields which coact in promoting greatest intensity of light straight ahead, the uppermost field serving to direct light in part downwardly and the lowermost field serving to direct light in part upwardly, the light from both of said fields preferably being projected to merge just below a theoretical point called the C-point by lens regulations, which point is located approximately 100 ft. ahead of the headlights and in the center of the roadway 57 inches above the ground.

A still further object is to provide a lens having prismatic fields disposed to the right and to the left of the center or main prismatic field and designed to project light correspondingly to the right or the left, so that light will be spread on both sides of the roadway to such an extent as to illuminate curves and objects at the sides of the roadway such as signposts and the like.

A still further object is to provide a lens having prisms throughout its area designed to project diffused light for a long distance when used in connection with high candle power incandescent lamps without blinding an approaching driver, the entire lens in practice appearing as a silver disc to an approaching driver.

A still further object is to provide a lens having a lower central field particularly designed to direct light rays upwardly so that when hill-climbing the entire hill will be within the range of vision of the driver instead of only a portion thereof in front of the automobile as hitherto.

With the above and other objects in view the invention consists in certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a front elevation of a lens constructed in accordance with my invention, Figure 2 is a vertical sectional view on the line 2—2 of Figure 1, reduced in size and showing the radii of both the inner and outer faces of the prisms, Figure 3 is a transverse sectional view taken on the line 3—3 of Figure 1, Figure 4 is a vertical sectional view taken on the line 4—4 of Figure 1, Figure 5 is a vertical sectional view taken on the line 5—5 of Figure 1, Figure 6 is a fragmentary transverse sectional view taken on the line 6—6 of Figure 1, Figure 7 is a fragmentary transverse sectional view taken on the line 7—7 of Figure 1, Figure 8 is a fragmentary transverse sectional view taken on the line 8—8 of Figure 1, Figure 9 is a fragmentary transverse sectional view taken on the line 9—9 of Figure 1, Figure 10 is a fragmentary transverse sectional view taken on the line 10—10 of Figure 1, Figure 11 is a vertical sectional view somewhat diagrammatic showing how the prismatic fields project light to meet just below the C-point, Figure 12 is a transverse sectional view somewhat diagrammatic showing how the lateral prismatic fields spread the light and also showing how the light is diffused by the left lateral field so as not to affect the eyes of a driver at the D-point which is theoretically seven feet to the left of the C-point, and Figure 13 is a diagrammatic view of the lens showing the prismatic fields and the subdivisions thereof.

Referring now to the drawings in which like characters of reference designate similar parts in the various views, 10 designates in general a lens constructed in accordance with my invention. The lens is, as usual, dished relative to the flat securing rim 11, and the dished portion is composed of a plurality of prisms 12. For purposes which will presently be fully explained each prism varies in thickness from the top to the bottom thereof, according to its location in the lens. The prisms are grouped in fields to be hereinafter referred to as prismatic fields, preferably as shown diagrammatically in Figure 13.

The main prismatic fields are designated as upper, center, lower, and right and left, and each of these fields is sub-divided irregularly as shown, to produce subsidiary fields. Preferably, the upper comprises two subsidiary fields $a$ and $b$, the right comprises three subsidiary fields $c-e$ inclusive, the left comprises three subsidiary fields $f-h$ inclusive, the center comprises eight subsidiary fields $i-p$ inclusive, and the lower comprises four subsidiary fields $q-t$ inclusive.

The prismatic fields above referred to throw the light rays substantially in one certain direction for each field. The upper center field projects light for the most part forwardly and downwardly as shown in Figure 11, while the lower center field projects light for the most part forwardly and upwardly. The center field projects light substantially straight forward. The right field throws light for the most part downwardly and to the right so as to illuminate road signs as well as the sides of curves away from the driver, while the left field projects light for the most part to the left as well as downwardly whereby to illuminate approaching objects, as best shown in Figure 12 by the designation D-point which is the eye of an approaching driver, seven feet to the left of the center of the road marked C-point. The left field will obviously illuminate the side of a curve opposite to that illuminated by the right field. This distribution of light rays is in the main forwardly as will be seen, the most intense illumination being straight forward and effected by the projected light from the upper, lower and center fields which meet just below a point substantially 100 feet straight ahead 57 inches above the center of the roadway, and designated by traffic regulations for legalizing headlights as the C-point.

As best shown by Figures 1, 2 and 3 the subsidiary fields $j$, $m$ and $n$, located at the center of the lens depart from the general dished contour of the lens and extend substantially in a flat plane perpendicular to the central axis of the lens. The prisms composing these fields are also substantially thinner throughout their vertical and horizontal dimensions than those of the fields bordering them. These dual structural characteristics serve to increase the luminous intensity of the light from the center field so that more light is obtained for illuminating the roadway straight ahead and since the prisms diffuse the light, high candle power incandescent lamps may be safely used to produce long distance illumination without blinding glare.

Consequently, my improved lens may be characterized by exhibiting centrally located contiguous prisms disposed in a plane perpendicular to the central axis of the lens and being substantially thinner longitudinally and transversely than adjacent prisms disposed in a dished portion of the lens which surrounds said centrally disposed prisms.

As previously stated, each individual prism is designed as to longitudinal curvature of the outer face and of the inner face to produce a predetermined thickness of the prism. In a general way it may be stated that each prism is thinnest at the top and uniformly increases in thickness towards the bottom where it reaches its greatest thickness.

Figures 2, 4 and 5 best illustrate the variations in thickness longitudinally of the prisms. By referring to Figure 2 it will be observed the radii 13 and 14 struck from the center 15 on the axial center line of the lens, are the radii of arcs which constitute the general curvature of the outer and inner faces respectively of the dished lens. The numerals 16 to 22 inclusive designate radii of the specific curvatures of the inner faces of the vertical central row of prisms in the subsidiary fields designated $a$, $b$, $i$, $j$, $m$, $n$ and $q$. The radii 16' to 22' inclusive designate radii of the curvatures of the outer faces respectively of the said prisms. The radius 14' is the radius of curvature of the outer face of the lower central prism $r$. The radius of curvature of the inner face of said prism is identical with the radius 14 struck from the center 15.

It will be observed from the above that each prism is curved vertically both on the outside face and on the inside face of the lens independently of the general curvature of the dished lens, and furthermore, the curvature of the outer face of each prism is reversed with respect to the curvature of the inner face. It will also be observed that the center of the outer radius of curvature of each prism is disposed in a different horizontal plane than the center of the radius of curvature of the inner face, as for example, see $x$ and $y$ of the radii 16' and 16. As a result of the above described characteristics each prism is thinnest at the top and uniformly increases in thickness towards the bottom where the greatest thickness, and consequently, the greatest refraction of light occurs.

Consequently, my improved lens may also be characterized by exhibiting contiguous prisms curved vertically independently of the general curvature of the lens, the curvature of both the inside face and the outside face of each prism being reversed with respect to each other, the centers of the radii of curvature of the inside and outside faces of each prism being disposed in different horizontal planes.

It is desirable to diffuse the light rays over the entire surface of the lens and so for this purpose the thickened bases of the group of prisms in each field are off-set with respect to those of the adjacent field, as may be best seen by now referring again to Figure 1. In this figure it will be seen that the lower boundaries of the fields $a$, $b$, $c$, $f$, $d$ and $g$ are arcs 23, 24, 25, 26, 27 and 28 having as their center the upper terminal point A of the vertical diameter A—B of the lens, as well as arcs 29, 30, 31 and 32 having the center C of the lens as their center. An arc 33 struck from a center considerably beyond the lower point B of the vertical diameter of the lens completes the lower boundary of the fields above mentioned as well as the fields $e$ and $h$.

The lower boundary of the fields $j$, $k$ and $l$ is formed by an arc 34 struck from the same center as the arc 33. The lower boundaries of the fields $o$, $p$ are formed by an arc 35 having said same center as the arc 33. The lower boundary of the field $q$ is formed by an arc 36 struck from a point $z$ situated on the center line A—B slightly below a straight lower border line 37 which divides the fields $m$ and $n$, as shown. A second straight line boundary 38 parallel with the boundary 37 forms the lower boundary of the field $n$.

As above described it will be seen that the lower boundaries of the various fields constituted by the thickened lower ends of the prisms are in so far as possible located in arcuate lines so that while there will be regularity displayed in the distribution of the thickened ends of the prisms still at the same time, the thickened ends of prisms in adjacent or contiguous fields will seldom lie in straight lines across the face of the lens. This is best shown in Figures 4 and 5 and also 6 to 10 inclusive. Consequently, my improved lens may be still further characterized by exhibiting contiguous fields composed of prisms having reversely curved inner and outer faces to provide thickened lower ends, said fields having lower boundaries comprising thickened lower ends of the respective prisms of each field, said boundaries being arcuate in outline whereby to dispose the thickened ends of the prisms of adjoining fields out of alignment with each other so as to distribute said thickened ends in curvilinear patterns throughout the face of the lens.

An additional departure from ordinary lens construction will be observed by referring to Figures 3 and 6 to 10 inclusive which are transverse sections through various fields of the lens. In addition to being curved longitudinally in the specific manner above carefully outlined, each prism is curved transversely throughout its width both on the outer face and the inner face as clearly illustrated in the figures referred to. The extent of curvature will depend obviously upon the width of the prism. Each prism consequently acts somewhat in the nature of a meniscus lens to direct diffused light in a direction corresponding to its position in the lens structure as heretofore described in detail.

My improved lens may therefore be still further characterized by exhibiting a plurality of prisms having reversely curved inner and outer faces longitudinally and having inner and outer faces curved transversely resulting in a prism arched transversely throughout whereby strength is promoted as well as embodying in each individual prism the advantages of a miniature lens.

Having thus described the invention, I claim:

An automobile headlight lens comprising prismatic fields including upper, lower, right, left and center fields, each field being adapted to direct light in a predetermined definite direction, said upper and lower fields as well as the center field being adapted to direct light to merge straight ahead, said left and said right fields being adapted to direct light correspondingly to the left and to the right to illuminate both sides of curves, the centrally located field of contiguous prisms being disposed in a plane perpendicular to the axis of light projection of the lens, the remaining fields of prisms being disposed in a dished portion of the lens terminating in a flat retaining rim at the edge of the lens, said center prisms being substantially thinner longitudinally and transversely than the prisms disposed in said dished portions, the curvature of both the inside face and the outside face of each prism of all of the fields being reversed with respect to each other, the centers of the radii of curvature of the inside and outside faces of each prism being disposed in different horizontal planes, the prisms of all of said fields having reversely curved inner and outer faces to provide thickened lower ends, all of said fields having lower boundaries comprising the thickened lower ends of the respective prisms of each field, the boundaries being arcuate in outline whereby to dispose the thickened ends of the prisms of adjoining fields out of alinement with each other and distribute said thickened ends in curvilinear patterns throughout the face of the lens.

In testimony whereof I affix my signature.

GUSTAF HERMAN NYSTROM. [L. S.]